D. E. DUFRESNE AND W. ADAMSON.
DEFATTING APPARATUS FOR ABATTOIRS.
APPLICATION FILED OCT. 24, 1919.

1,334,694.

Patented Mar. 23, 1920.
2 SHEETS—SHEET 1.

Inventors:
David E. Dufresne
William Adamson
By William Clinton
Attorney

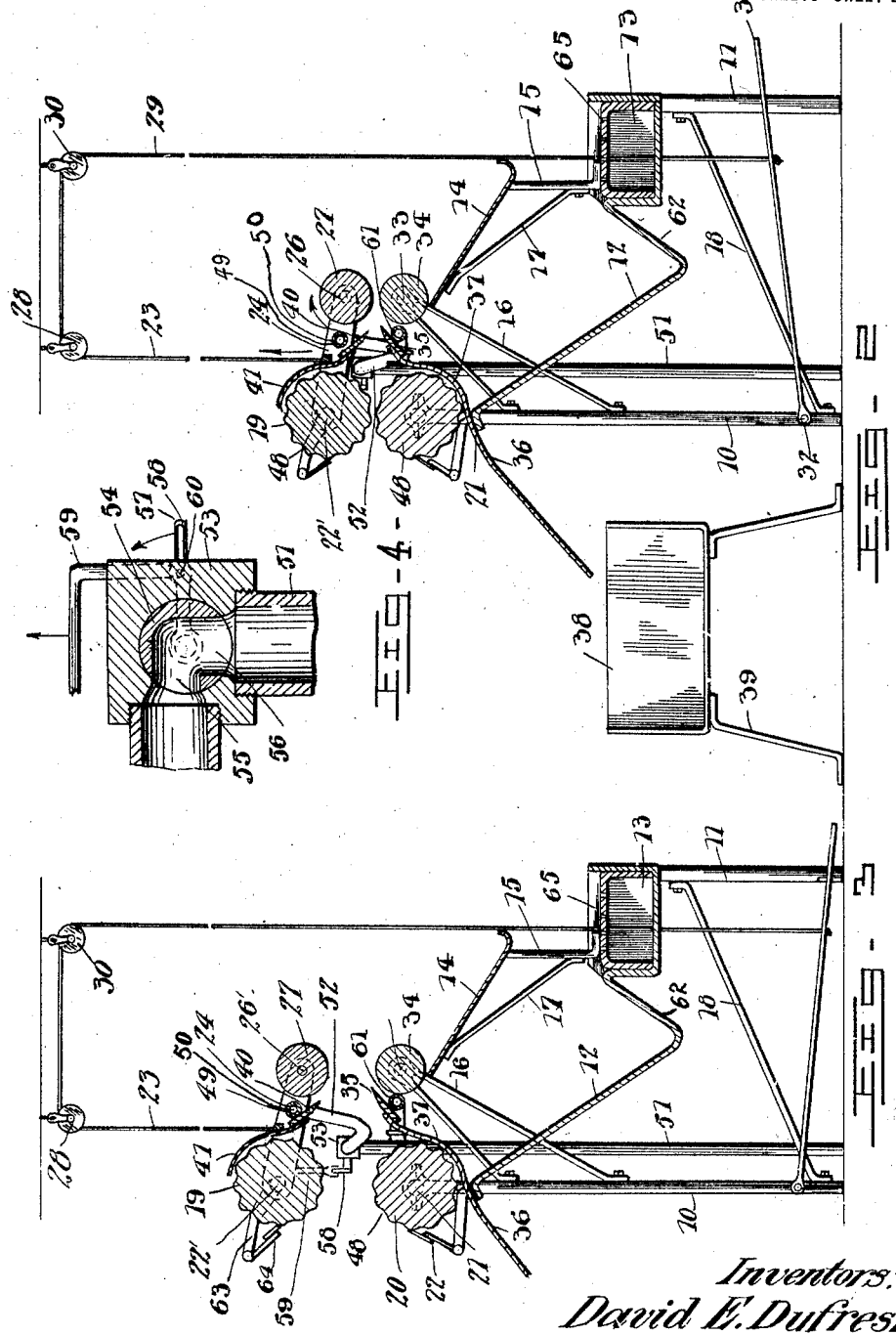

UNITED STATES PATENT OFFICE.

DAVID E. DUFRESNE AND WILLIAM ADAMSON, OF ST. LAMBERT, QUEBEC, CANADA.

DEFATTING APPARATUS FOR ABATTOIRS.

1,334,694.   Specification of Letters Patent.   Patented Mar. 23, 1920.

Application filed October 24, 1919. Serial No. 333,033.

*To all whom it may concern:*

Be it known that we, DAVID E. DUFRESNE and WILLIAM ADAMSON, both subjects of the King of Great Britain, residing at St. Lambert, Province of Quebec, Canada, have invented certain new and useful Improvements in Defatting Apparatus for Abattoirs; and we do hereby declare that the following is a full, clear, and exact description of the invention, such as will enable others skilled in the art to which it appertains to make and use the same.

The present invention relates to apparatuses used in connection with abattoirs or the like and more particularly an apparatus for defatting or collecting fats from the carcasses of slaughtered animals.

The principal object of the present invention is to provide mechanical means for collecting fats from slaughtered animals and delivering the fat products and residue in separate containers.

A further object is to provide for the proper commercial and sanitary disposal of the waste material, so that the fats which are severed from the various parts of the slaughtered animal may be easily and readily gathered.

With the above and other objects in view which will hereinafter appear as the description continues, the invention consists of the novel features of construction, combination and formation of parts as will be hereinafter more fully described and particularly pointed out in the appended claims.

In the accompanying drawings:

Fig. 2 is a vertical transverse section through one of the tables and defatting units, illustrating the collecting mechanism in operative position;

Fig. 3 is a similar view, illustrating the defatting mechanism in inoperative position; and, Fig. 4 is a cross sectional view of the adjustable water supply valve.

Referring now more particularly to the accompanying drawings wherein like and corresponding parts are designated by similar reference characters throughout the several views.

Figure 1:
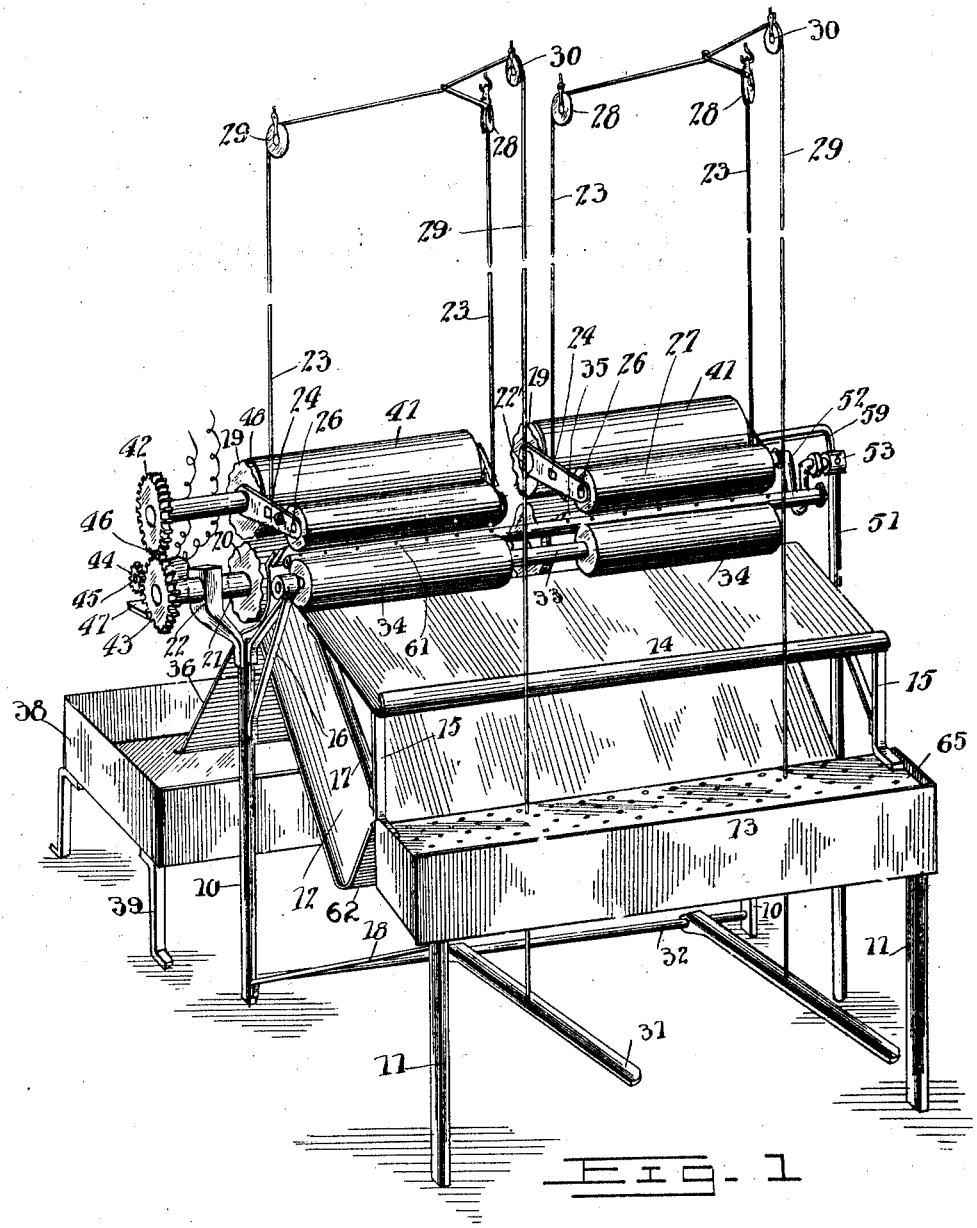
Figure 1 is a perspective view of the apparatus.

Heretofore, the operation for the gathering or collection of the fats from slaughtered animals has been accomplished by means of so called defatting tables and the fat products have been usually removed or severed from the various parts of the animal, necessitating undue time and labor.

With the view of obviating the above mentioned defects, encountered in the previous defatting operations, we have provided an apparatus for automatically removing the fats from the severed parts of the animal and at the same time, provide for the sanitary disposition of the waste material.

The apparatus illustrated in the drawings comprises a fatting table, supported upon the uprights or legs 10 and 11, the latter having mounted thereupon an inclined rear wall 12 and a gutter or trough 13 respectively.

An inclined wall 14 serving as a feeding table for the parts to be defatted, is supported at its lower end upon brackets 15, connected to the end portions of trough 13, while its upper end is connected to the brackets 16 secured to the rear legs 10. Further support is afforded table 14 by the angularly disposed bars 17 connected to brackets 15 and the said table, while cross bars 18 connect legs 10 and 11 of the table and impart certain rigidity thereto.

The defatting mechanism comprises upper and lower rollers 19 and 20, preferably arranged in series of two, as illustrated in Fig. 1, so that two operators may work at the same table, but it is manifest that a table may be provided for greater or less number of operatives as is desired.

The lower or stationary rollers 20 are mounted upon a shaft 21 having bearings in brackets 22 secured to the upper ends of the table supporting legs 10, while the upper or adjustable rollers 19 are mounted on a shaft 22' above the lower rollers 20 and supported by means of cables 23. Cables 23 are connected to arms 24 which latter have mounted in their upper extremities the shaft 22' of rollers 19 and in the lower extremities the shaft 26 of the small guide rollers 27. These cables 23 operate over tackles 28 secured to the ceiling in any desirable manner, and attached to said cables 23 are the main cables 29 which pass over tackles 30, likewise secured to the abattoir ceiling. Cables 29 at their lower ends are secured to the tread pedals 31 mounted on a shaft 32 secured at its ends to the legs 10 of the frame.

Foot pressure by the operator will actuate the cables 23 and 29 and thus cause the elevation of the upper rollers 19 and 27.

Mounted on a shaft 33, having bearings in brackets 16 secured to the frame legs 10, are the lower guide rollers 34 which latter are spaced from each other at their inner ends and disposed in axial alinement with the small guide rollers 27. The function of rollers 27 and 34 is to direct or guide the animal parts to be defatted to the defatting blades.

The defatting blade or knife 35 is secured to the upper marginal edge of a deflecting plate 36, which latter is secured to the upper end of the frame plate 12. The deflecting plate 36 is formed wtih a concave convex portion 37 which passes under the lower rollers 20 and the outer portion of said plate 36 inclines downwardly from said rollers 20, to a point over a suitable receiving tray 38, supported upon legs 39.

Another blade or knife 40, adapted for coöperation with the blade 35, is secured to the lower marginal edge of a semi-arcuate shaped plate 41 which has a portion extending upwardly and partly over the upper roller.

This plate 41 is secured to the arms 24 which carry rollers 19 and 27, and consequently when the foot pedals 31 are pressed downwardly, the upper blade 40 and said rollers 19 and 27 are elevated.

When the cutting blades are in operative position, illustrated more particularly in Fig. 2, the cutting edges of the blades due to the angular continuity of the same, are disposed at a slight angle to the horizontal opening or space between the main rollers 19 and 20 and the guide rollers 27 and 34.

The shafts 21 and 22' carrying rollers 19 and 20 have gears 42 and 43 keyed thereon and the lower gear 43 has meshing engagement with a gear 44 arranged on the drive shaft 45 of an electric motor 46, supported upon a platform 47 secured to brackets 22.

Motion for driving rollers 19 and 20 is imparted to shafts 21 and 22' through the gears above mentioned and the animal parts are first placed between the upper rollers 19 and 27 and the lower rollers 20 and 34, when the said upper rollers are elevated by pressing down on the pedal 31. As the feed rollers 19 and 20 are provided with longitudinal convolutions 48, the convoluted surface of the said rollers will draw the animal parts through the space between the upper and lower rollers and thus the cutting blades 35 and 40 will engage the upper and lower surface of the said animal parts and cut away the fats adhering thereto.

Before cutting the fat from the intestines or other animal parts, it is desirable to raise their temperature to about ninety degrees Fr. so as to provide better working conditions. Hot water from a pipe 49 will flow over the intestines or animal parts through the perforations 50 provided therein and said pipe 49 is connected to the main pipe 51 leading to the hot water supply by a flexible pipe connection 52. A valve casing 53 is mounted on the upper end of supply pipe 51 and has pivotally mounted therein the valve plug 54 formed with ports 55 and 56, adapted to register with pipe 51 and the flexible pipe connection 52 when adjusted.

Valve plug 54 at its central part is connected to an arm 57, having a slotted outer end 58 and a lever 59 has its upper end connected to one of the arms 24 carrying rollers 19 and 27, while its opposite end is bent at right angles and adjustably connected to the valve arm 57 by means of a wing bolt 60. This wing bolt 60 takes into the slot provided in the end of arm 57 to regulate the throw of the valve plug 54, wherein the rollers 19 and 27 and consequently arms 24 are elevated.

When arms 24 are elevated by actuating cables 23 and 29, by means of the pedals 31, the arm 57 and lever 59 are actuated which in turn moves the valve plug 54 to such position that the ports 55 and 56 are out of register with the main pipe 51 and the flexible pipe 52, so that the hot water supply is cut off. During the defatting operation, the pedal 31 is pushed downwardly by the foot of the operator, and consequently the valve plug is revolved to register its ports with the pipes 51 and 52, whereby the water supply is shut off.

Arranged above the upper end of wall 12 of the fatting table is a perforated pipe 61 and this pipe communicates with a suitable cold water supply.

This cold water supply is permitted to drain down the inclined wall 12 and serves to lower the temperature of the fat that may drip down from the rollers 19 and 34 and the cutting blades 40 and 35 into the trough formed between plate 12 and its upwardly directed lower portion 62.

As before stated, the intestines are run through the upper and lower rollers and consequently the fatty substance is scraped or cut away and will gravitate down the inclined wall 12 to the table trough.

However, a relatively large amount of this fat will adhere to the rollers 19 and 20 during the defatting operation, and I have likewise provided an attachment for each of the said rollers for scraping the same. Such attachment comprises levers 63 having their inner ends connected to arms 24.

The outer ends of these levers 63 have connected thereto the scraping knives or blades 64 adapted for engagement with the convoluted surfaces of the said rollers 19 and 20. As the rollers 19 and 20 revolve, these knives 64 scrape off the accumulated fat and thus serve not only to conserve this supply, but keep the said rollers clean.

The gutter or trough 13 is provided with a perforated plate 65. The perforations within said plate 65 are so proportioned that the water and other liquid contained thereupon may drain from the intestines or fats, but the fats will not pass through these perforations, thereby providing a suitable drainage for the fats and preventing another loss thereof.

The intestines or fatty animal parts contained upon the plate 65 is passed by the operator between the rollers 19, 20, 27 and 34, and after being worked or scraped are passed into the receiving tray 38. This tray may have a suitable drain to the sewerage system, whereby any drainage from the worked over animal parts may be passed thereto. Likewise a suitable drainage connection may be attached to the gutter of trough 13 which will exhaust liquids in a similar manner as above stated.

From the foregoing, it is obvious that we have provided a beef fatting apparatus in which the intestines of a slaughtered animal may be mechanically handled in a sanitary manner and the fat severed from the intestines may be easily and readily gathered.

Having thus fully described our invention, what we claim as new and desire to secure by Letters Patent is:

1. A defatting apparatus comprising a supporting frame, a stationary feed roller journaled in said frame, brackets connected to said frame, a stationary guide roller journaled in said brackets, adjustable feed and guide rollers arranged above the first mentioned rollers, plates connected to said frame, a pair of cutting blades secured to said plates, supporting means for the adjustable rollers, and means for collecting fats from the animal parts inserted between the said rollers.

2. A defatting apparatus comprising a frame, a feeding table arranged on said frame, a fat collecting trough, a pair of rollers journaled in said frame, a pair of adjustable rollers disposed above the first mentioned rollers, supporting means for the upper rollers, a pair of cutting knives arranged between the upper and lower rollers, supporting means for the cutting knives, means for collecting fats from the animal parts inserted between the said rollers, and operative means for said rollers.

3. A defatting apparatus comprising an upright supported frame, rollers journaled in said frame, a pair of rollers adapted for coöperation with the first mentioned rollers for feeding and guiding animal parts through the apparatus, supporting means for the second mentioned rollers, plates secured to said frame, a pair of blades arranged on said plates and adapted for cutting the fat from the animal parts inserted between said rollers, a trough for collecting the fat from said blades, and means for delivering the residue separate from said fats.

4. A defatting apparatus comprising a frame, feed and guide rollers operable in said frame, the upper feed and guide rollers being vertically adjustable, supporting means for the upper rollers, plates arranged on said frame, knives mounted on said plates and disposed between the upper and lower parts of rollers, actuating means for the feed rollers, the said knives adapted for severing the fat from the animal parts inserted between the said upper and lower rollers, a trough arranged on said frame, said trough adapted for collecting the fat from said blades, and blades for collecting the fat from said feed rollers.

5. A defatting apparatus comprising a frame, feed and guide rollers operable in said frame, the upper feed and guide rollers being vertically adjustable, supporting means for the upper rollers, plates arranged on said frame, knives mounted on said plates and disposed between the upper and lower parts of rollers, actuating means for the feed rollers, the said knives adapted for severing the fat from the animal parts inserted between the said upper and lower rollers, a trough arranged on said frame, said trough adapted for collecting the fat from said blades, blades for collecting the fat from said feed rollers, and means for maintaining the animal parts at a proper working temperature during the defatting operation.

6. A defatting apparatus comprising a supporting frame, feed and guide rollers journaled in said frame, a pair of rollers disposed above the first mentioned rollers, supporting arms for the said upper rollers, a plate secured to said frame, a plate mounted on the arms, cutting knives carried by said plates, said knives positioned between the said upper and lower rollers, means for actuating said feed rollers for delivering the animal parts to said cutting blades, and means for heating the animal parts during the defatting operation.

7. An apparatus for cutting fats from animal intestines comprising a frame, upper and lower feed rollers journaled in said frame, upper and lower guide rollers, a pair of knives interposed between said upper and lower rollers, a trough mounted on said frame and adapted for receiving the fats from said knives, water supply pipes arranged contiguous to said knives, means for adjusting the upper rollers with respect to said lower rollers, and a valve adapted for regulating the water supply upon the elevation and lowering of the said upper rollers.

8. An apparatus for cutting fats from animal intestines comprising a frame, upper and lower feed rollers journaled in said frame, upper and lower guide rollers, a pair of knives interposed between said upper and lower rollers, a trough mounted on said frame and adapted for receiving the fats from said knives, water supply pipes arranged contiguous to said knives, means for adjusting the upper rollers with respect to said lower rollers, a valve adapted for regulating the water supply upon the elevation and lowering of the said upper rollers, and means for collecting the accumulated fats from the said feeding rollers.

9. An apparatus for collecting fats from animal intestines comprising a supporting frame, feed and guide rollers journaled in said frame, knives disposed between said rollers, operative means for said rollers, the said knives adapted for cutting the fats from the intestines passing between said rollers, a water supply pipe, a valve arranged in said supply pipe and adapted, upon the lowering of one of said knives, to cause the hot water spraying of the intestines during the defatting operation.

10. A defatting apparatus comprising a frame, supporting uprights for said frame, a shaft journaled in said uprights, a roller operable with said shaft, brackets arranged in said uprights, a shaft journaled in said brackets, a roller carried by said shaft, a pair of rollers disposed above the last mentioned rollers, supporting means for said upper rollers, plates secured to said frame, a pair of knives arranged on said plates, operative means for said rollers, a feeding table connected to said frame, a fat collecting trough, and a vessel for the collection of the residue after the defatting operation.

In witness whereof we have hereunto set our hands.

DAVID E. DUFRESNE.
WILLIAM ADAMSON.